United States Patent
Jaradi et al.

(12)

(10) Patent No.: US 9,994,182 B1
(45) Date of Patent: Jun. 12, 2018

(54) ROOF MOUNTED PARTITIONING AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/628,910

(22) Filed: Jun. 21, 2017

(51) Int. Cl.
| | |
|---|---|
| *B60R 21/214* | (2011.01) |
| *B60R 21/2338* | (2011.01) |
| *B60R 21/237* | (2006.01) |
| *B60R 21/232* | (2011.01) |
| *B60R 21/231* | (2011.01) |

(52) U.S. Cl.
CPC .......... *B60R 21/214* (2013.01); *B60R 21/232* (2013.01); *B60R 21/237* (2013.01); *B60R 21/2338* (2013.01); *B60R 21/231* (2013.01); *B60R 2021/23153* (2013.01); *B60R 2021/23161* (2013.01); *B60R 2021/23192* (2013.01); *B60R 2021/23382* (2013.01)

(58) Field of Classification Search
CPC . B60R 21/214; B60R 21/232; B60R 21/2338; B60R 2021/23153; B60R 2021/23382
See application file for complete search history.

(56) References Cited

U.S. PATENT DOCUMENTS

| | | | | |
|---|---|---|---|---|
| 2,834,606 | A * | 5/1958 | Bertrand | ................ B60R 21/16 206/522 |
| 3,795,412 | A * | 3/1974 | John | ...................... B60R 21/08 180/274 |
| 5,470,103 | A * | 11/1995 | Vaillancourt | ......... B60R 21/214 280/730.1 |
| 5,775,726 | A * | 7/1998 | Timothy | ............... B60R 21/013 280/730.1 |
| 6,817,626 | B2 * | 11/2004 | Boll | ...................... B60R 21/213 280/730.1 |
| 7,690,684 | B2 * | 4/2010 | Tobaru | ................... B60R 21/13 280/730.1 |
| 7,926,840 | B1 | 4/2011 | Choi | |
| 8,087,690 | B2 | 1/2012 | Kim | |
| 8,602,448 | B2 | 12/2013 | Choi et al. | |
| 9,340,126 | B2 | 5/2016 | Cuddihy et al. | |
| 9,421,934 | B1 * | 8/2016 | Witt | ...................... B60R 21/06 |

(Continued)

FOREIGN PATENT DOCUMENTS

| | | | | |
|---|---|---|---|---|
| DE | 10039800 A1 * | 2/2002 | .......... | B60R 21/214 |
| DE | 10007343 B4 | 7/2010 | | |

(Continued)

*Primary Examiner* — Faye M Fleming
(74) *Attorney, Agent, or Firm* — Frank A. MacKenzie; Bejin Bieneman PLC

(57) ABSTRACT

An airbag assembly includes an airbag, roof mounting tethers, guide tethers and guides. The airbag when inflated has an upper part at a roof and a lower part above a floor and extends laterally across a vehicle interior. The roof mounting tethers are on a left side and a right side of the upper part. The guide tethers at a left side and a right side of the lower part connect to left and right guides. The guides are slidably engageable with first and second guide tracks.

20 Claims, 6 Drawing Sheets

(56) References Cited

U.S. PATENT DOCUMENTS

| | | |
|---|---|---|
| 9,446,735 B1 | 9/2016 | Jayasuriya et al. |
| 9,610,915 B2 * | 4/2017 | Specht .................. B60R 21/213 |
| 2007/0007755 A1 | 1/2007 | Bauer et al. |
| 2017/0015269 A1 * | 1/2017 | Min ...................... B60R 21/214 |
| 2017/0106728 A1 * | 4/2017 | Nania .................... B60J 3/0243 |
| 2017/0267199 A1 * | 9/2017 | Schutt .................... B60R 21/08 |

FOREIGN PATENT DOCUMENTS

| | | | |
|---|---|---|---|
| JP | 2004249845 A | * | 9/2004 |
| JP | 2012011921 A | * | 1/2012 |
| JP | 201688413 A | | 5/2016 |

* cited by examiner

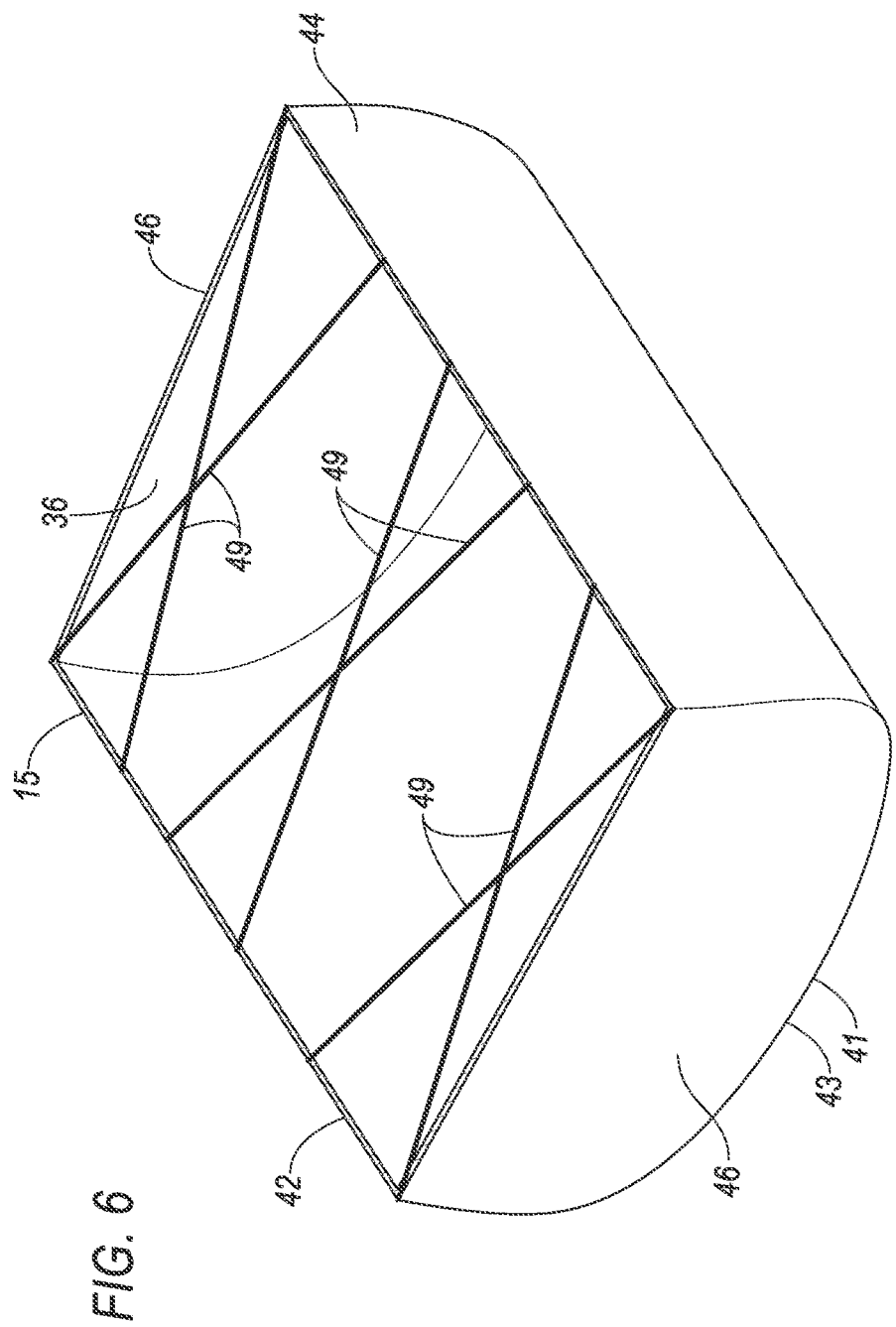

ROOF MOUNTED PARTITIONING AIRBAG

BACKGROUND

Autonomous vehicles, i.e., vehicles not requiring human intervention, will allow seats, including the front seats, to swivel 360 degrees. Front seat passengers will be allowed to face rear seat passengers. Passengers in such a seating configuration may not be protected by airbags when the airbags are located in common mounting locations, e.g., steering columns, instrument panels, seat backs and vehicle doors. It is desired to provide an airbag configuration suited for providing supplemental protection to passengers when they are seated in a mutually facing orientation.

BRIEF DESCRIPTION OF THE DRAWINGS

FIG. 6 is a section view of the example airbag of FIG. 5.

DETAILED DESCRIPTION

Figure 1:
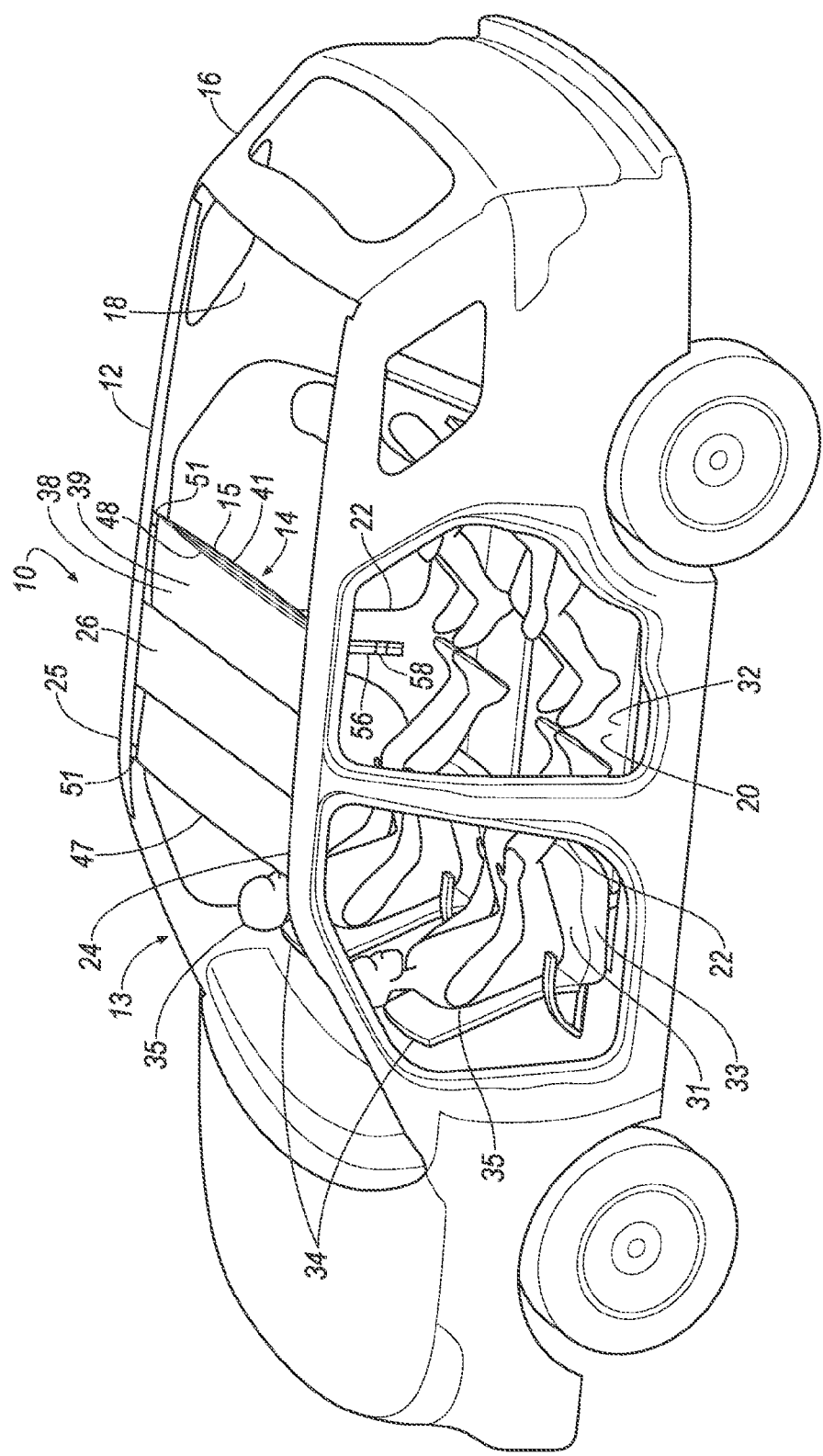
FIG. 1 is perspective view of an example vehicle with an example airbag in an undeployed condition.
Figure 2:
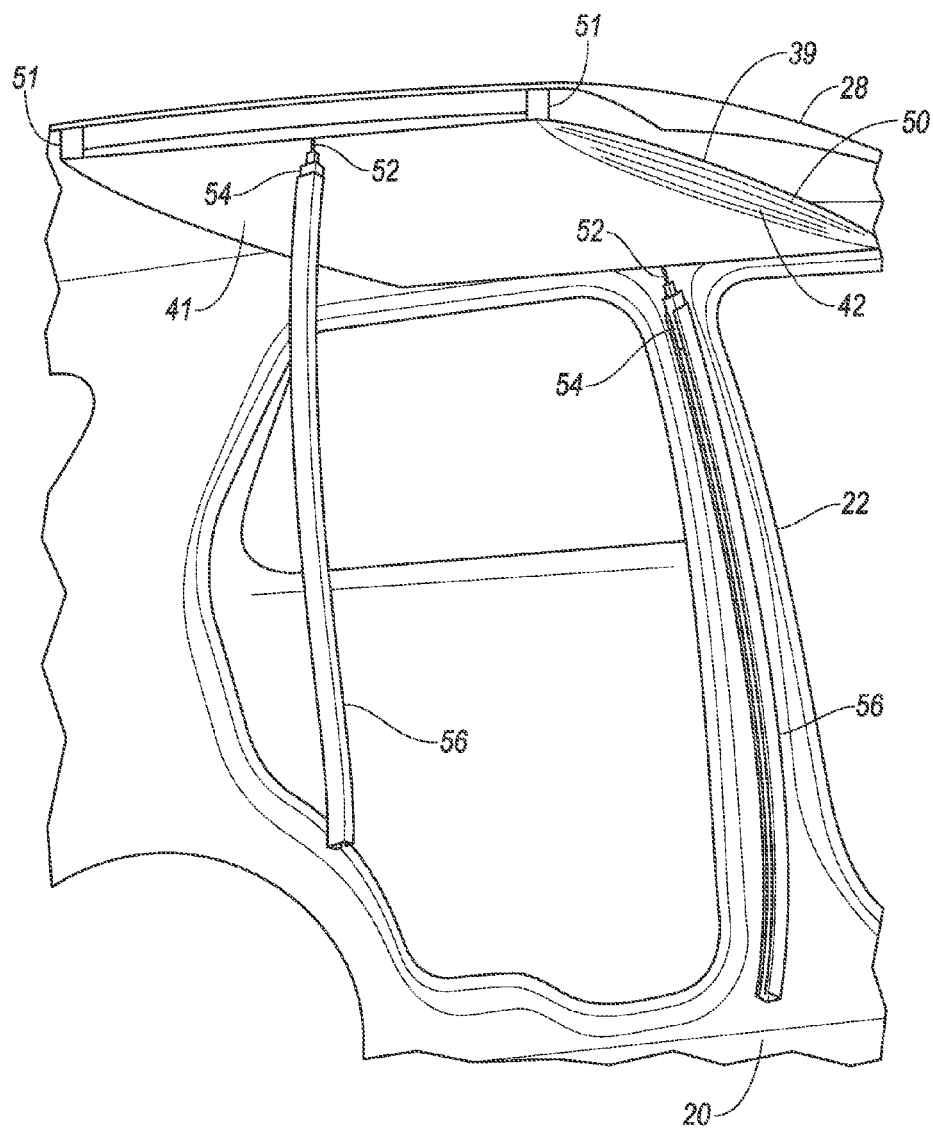
FIG. 2 is a perspective view of a broken-out portion of the example vehicle of FIG. 1, looking toward a left rear door, with the example airbag in an uninflated condition.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

An airbag assembly includes an airbag, roof mounting tethers, guide tethers and guides. The airbag when inflated has an upper part at a roof and a lower part above a floor and extends laterally across a vehicle interior. The roof mounting tethers are on a left side and a right a side of the upper part. The guide tethers at a left side and a right side of the lower part connect to left and right guides. The guides are slidably engageable with first and second guide tracks.

The airbag may have a front panel and a rear panel connecting the upper part and the lower part. The front and rear panels may have folds in an uninflated position.

The folds of the airbag assembly may be Z-shaped.

The airbag may have internal cross-bag tethers between the front and rear panels.

The airbag assembly may have an inflator connected to the upper part.

When the airbag is inflated, the lower part may be spaced a distance from the upper part a distance substantially equal to a distance between the roof and the floor.

The guides may each include a displacement actuator.

An airbag system includes an airbag, a first roof mounting tether, a second roof mounting tether, a first guide track, a second guide track, a first guide, a second guide, a first guide tether, and a second guide tether. The airbag, when inflated, has an upper part at a roof and a lower part above a floor and extends laterally across a vehicle interior. The first roof mounting tether is on a first lateral side of the upper part. The second roof mounting tether is on a second lateral side of the upper part. The first guide track is laterally outboard of a first lateral side of the airbag. The second guide track is laterally outboard of a second lateral side of the airbag. The first guide is slidably engaged with the first guide track. The second guide is slidably engaged with the second guide track. The first guide tether is between the first guide and the airbag. The second guide tether is between the second guide and the airbag.

The airbag system may have a displacement actuator fixed to the first and second guides.

The airbag system may have a retention latch on each track at a position associated with the airbag when the airbag is inflated.

The airbag of the airbag system may have internal cross-bag tethers.

The airbag system may have an inflator connected to the upper part.

The airbag of the airbag system may have a front panel and a rear panel connecting the upper part and the lower part, and the front and rear panels may have Z-shaped folds in an uninflated position.

A vehicle includes a roof, substantially vertical pillars, and an airbag system. The roof includes a fore-aft oriented first rail and a fore-aft oriented second roof rail. The pillars abut the roof rails and are disposed behind front doors. The airbag system includes an airbag, a first roof mounting tether, a second roof mounting tether, a first guide track, a second guide track, a first guide, a second guide, a first guide tether, and a second guide tether. The airbag, when inflated, has an upper part at the roof, a lower part above a floor and extends laterally across a vehicle interior. The first roof mounting tether is on a first lateral side of the upper part and connects the upper part to the first roof rail. The second roof mounting tether is on a second lateral side of the upper part and connects the upper part to the second roof rail. The first guide track is laterally outboard of a first lateral side of the airbag. The second guide track is laterally outboard of a second lateral side of the airbag. The first guide is slidably engaged with the first guide track. The second guide slidably engaged with the second guide track. The first guide tether on a first lateral side of the lower part between the first guide and the airbag. The second guide tether is on a second lateral side of the lower part between the second guide and the airbag.

The vehicle may include a headliner having a tear seam in substantial alignment with the airbag.

The vehicle may also have each guide track fixed to one of the pillars.

The vehicle may also have a displacement actuator fixed to each of the guides.

The vehicle may also have a retention latch on each track at a position associated with the airbag when the airbag is inflated.

The airbag of the vehicle may also have internal cross-bag tethers.

The airbag of the vehicle, when the airbag is inflated, may have the lower part spaced a distance from the upper part a distance substantially equal to a distance between a roof of a vehicle and a floor of a vehicle.

An example roof-mounted airbag system 10, as illustrated in FIGS. 1-6, may be incorporated into a roof 12 of a vehicle 13. The airbag system 10 may include an example airbag assembly 14 which in turn may include an example airbag 15.

The vehicle 13 may be operable in a non-autonomous, a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle 13 propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle 13 propulsion, braking, and steering.

Figure 5:
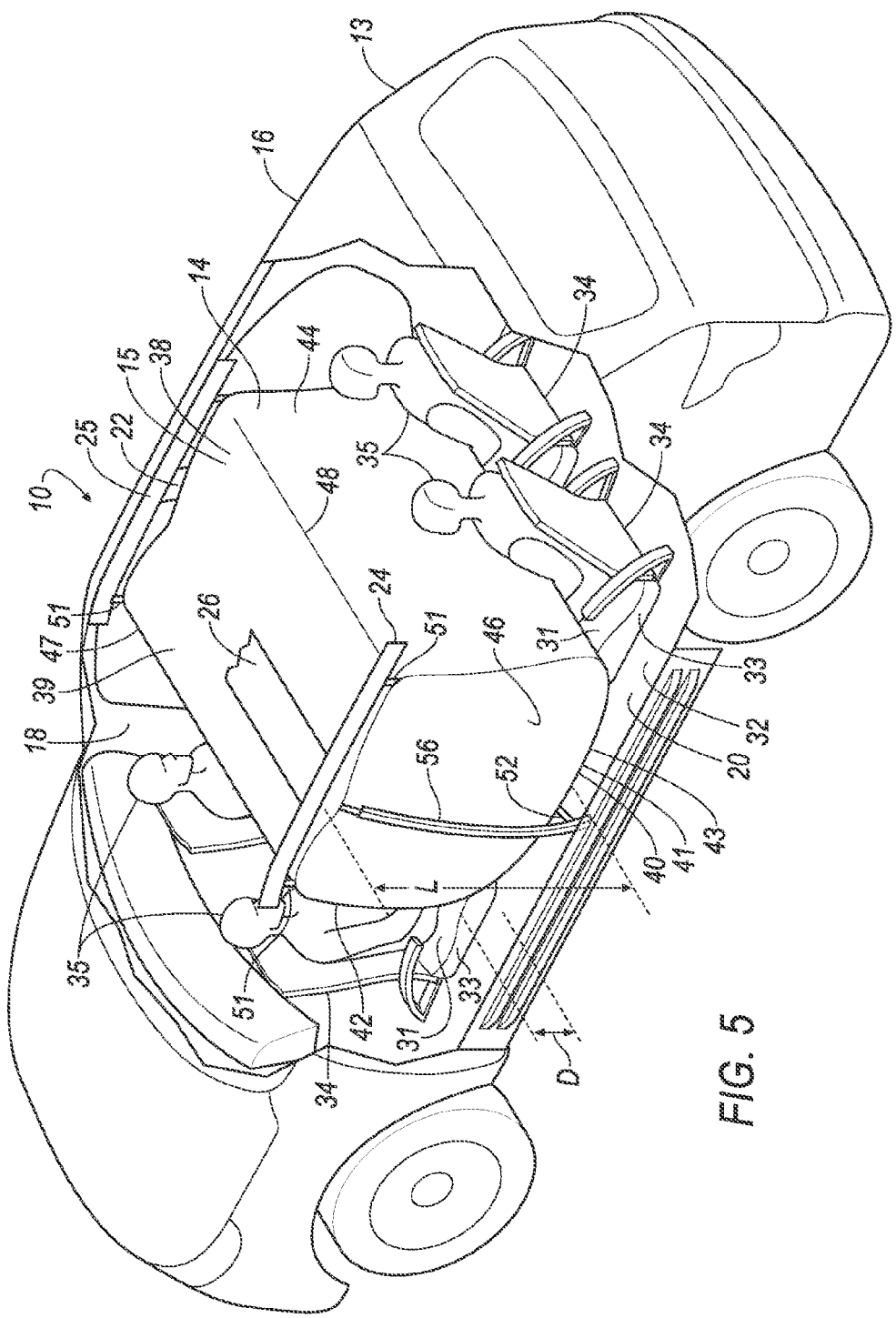
FIG. 5 is a perspective view of the vehicle of FIG. 1 with the example airbag in an inflated condition.

As shown in FIGS. 1 and 5, the vehicle 13 includes a vehicle body 16 defining a vehicle interior 18. The vehicle body 16 may include the roof 12, a floor 20, and a plurality of pillars 22 connecting the roof 12 and the floor 20. The vehicle body 16 may have a uni-body construction, a body-on-frame construction, or any other suitable construction.

Figure 3:
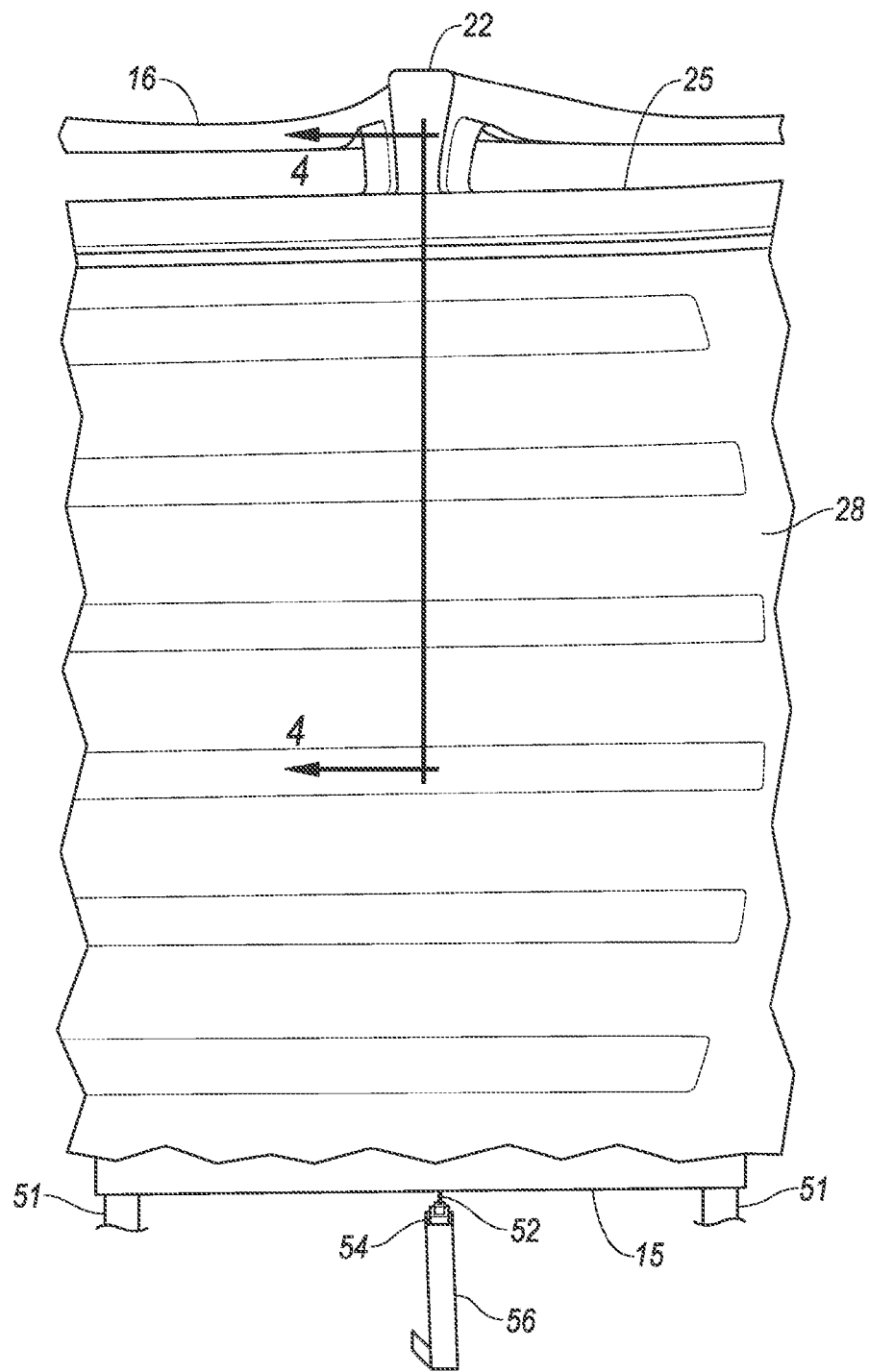
FIG. 3 is a plan view of a broken-out portion of the example vehicle of FIG. 1.

With reference to FIGS. 1 and 3, the roof 12 may include a longitudinally oriented left roof rail 24 and a longitudinally oriented right roof rail 25, both oriented substantially parallel to a longitudinal vehicle axis. The roof may further include cross members 26 transverse to the roof rails 24, 25 and connecting the roof rails 24, 25, and a roof panel 28 supported on the cross members 26 and the roof rails 24, 25. The roof 12 may support the airbag 15. For example, the airbag 15 may be connected to the roof rails 24, 25, as shown in FIGS. 1, 2, 4 and 5. The airbag 15 may be inflatable away from the roof 12, e.g., in a downward vertical direction, as in the direction of arrow C of FIG. 4, to an inflated, i.e., deployed, position illustrated in FIG. 5.

The floor 20 may include a plurality of cross-beams (not shown) and a floor panel 32 supported on the cross-beams. The floor 20 may include upholstery, e.g. carpeting, trim, etc., supported on the floor panel 32.

The vehicle interior 18 may include one or more seats 34. The seats 34 may have an associated seat bottom 33. The seat bottom be supported by and connected to the floor 20. A cushion surface 31 of the seat bottom may be a distance D above the floor 20. The illustrated example vehicle 13 shows four seats 34. However, the vehicle 13 may include any suitable number of seats 34, and the seats 34 may be arranged in any suitable arrangement. The seat 34 may be, for example, a bucket seat, a bench seat, a child seat, a booster seat, or any other suitable type of seat. The seats 34 may be mounted in a fixed position to the floor 20. Alternatively, the seats 34 may be moveable relative to the floor 20 of the vehicle 13, e.g., in a vehicle 13 fore-and-aft direction, in a cross-vehicle direction. The seats 34 may be rotatable about an axis transverse to the floor 20.

During autonomous operation of the vehicle 13, occupants 35 of the vehicle 13 may rotate their seats 34 to face one another. An example airbag 15, when in the inflated position, i.e., when inflated, may reduce a likelihood of the facing occupants 35 impacting one another. The airbag 15 may restrain movement of the occupants 35 toward each other when the seats 34 are facing each other.

The airbag defines an example cavity 36. The cavity 36 of the airbag 15 may be defined to be between an upper part 39 of the airbag 15 and a lower part 41 of the airbag 15. The upper part 39 may be in the form of a top panel 38. The lower part 41 may be provided by a bottom surface 40.

The top panel 38 may be rectangular in shape in both the inflated position and an uninflated, i.e. a stored or undeployed, position. The cavity 36 may be further defined by connecting panels disposed between the top panel 38 and the bottom surface 40.

The bottom surface 40 may be defined in any suitable way, including by a bottom panel 43, a wrap-around panel defining a front panel 42, the bottom panel 43, and a rear panel 44. A seam (not shown) may join the front panel 42 and the rear panel 44.

The connecting panels may include the front panel 42 and the rear panel 44. The connecting panels may also include intermediate connecting panels, e.g., side panels 46, disposed between the front panel 42 and the rear panel 44. The side panels 46 may also connect to the top panel 38 and the bottom surface 40. The front panel may have an upper edge 47 in engagement with the top panel 38. The rear panel 44 similarly may have an upper edge 48 in engagement with the top panel 38. The front panel may have a lower edge (not shown) at the bottom surface 40 and opposite the top panel 38. The rear panel likewise may have a lower edge (not shown) at the bottom surface and opposite the top panel 38. The lower edges may be in engagement with the bottom panel 43 when a discrete, i.e., separate, bottom panel 43 is provided. Alternatively, the lower edges of the panels 42, 44 may be in engagement with each other to form the bottom surface 40. Yet alternatively, there may not be a distinct, i.e., readily perceivable, upper edges or lower edges. The cavity 36 of the airbag 15 may be undivided, i.e., without interior walls or discrete, separate chambers.

A plurality of internal cross-bag tethers 49, illustrated in FIG. 6, may be disposed within the airbag 15 with the tethers 49 aiding in defining a shape of the airbag 15 in the inflated position.

The airbag 15 may have folds 50 in the connecting panels. For example, the front panel 42, the rear panel 44, and the side panels 46 may each have folds 50. The folds 50 may be zig-zag shaped, Z-shaped, etc. Z-shaped folds may include folds that resemble one or more Zs in series in a section of the fold 50.

The airbag 15 may be formed of a woven polymer or any other material. As one example, the airbag 15 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag assembly 14 may include, in addition to the airbag 15, mounting tethers 51, guide tethers 52, and guides 54.

Each mounting tether 51 may be fixed to an outboard, i.e., lateral, edge of the top panel 38. An example number of mounting tethers 51 is four, with one tether 51 located at each corner of the top panel 38. Each mounting tether 51 may connect to one of the roof rails 24, 25, thereby connecting the top panel 38 to the roof 12. The tether 51 may be formed of the same material as the airbag 15 and may be sewn on one end to the airbag 15. The tether 51 may also include metal hardware (not shown) facilitating engagement of the tether 51 to the associated rail, e.g., a grommet fixed to a fabric portion of the tether and a screw or other suitable fastener, e.g., rivet, Christmas tree clip, etc., passing through the grommet and into engagement with the associated rail 24, 25.

The guide tethers 52 may be connected to a lower end of the airbag 15, e.g., the bottom surface 40 or an end of the side panels 46 opposite the top panel 38. An example number of guides 54 and guide tethers 52 is two, with one on each of a left and right side, i.e., the lateral sides, of the airbag 15. The tethers 52 may be formed of the same material as the airbag 15 and may be sewn to the lower end of the airbag 15. Each guide tether 52 is also connected to one of the guides 54, thereby being between and connecting each guide 54 with the lower end of the airbag 15. Each guide 54 may be slidably disposed in or on its own guide track 56.

The guide tracks 56 are complementary in shape to, and slidably receive, their respective guides 54. The tracks 56 may be a mirror image of each other. Each track 56 may be, by way of example, a C-shaped or T-shaped track, i.e., channel, of constant cross section, or a rod or a rail. The guide tracks 56 may be disposed on opposite sides of the vehicle 13, and may be fixed to one of the substantially vertical pillars 22, e.g., a B-pillar located behind a front door. The guide tracks 56 are positioned on lateral sides of the airbag 15, and may be located outboard of the airbag 15.

Figure 4:
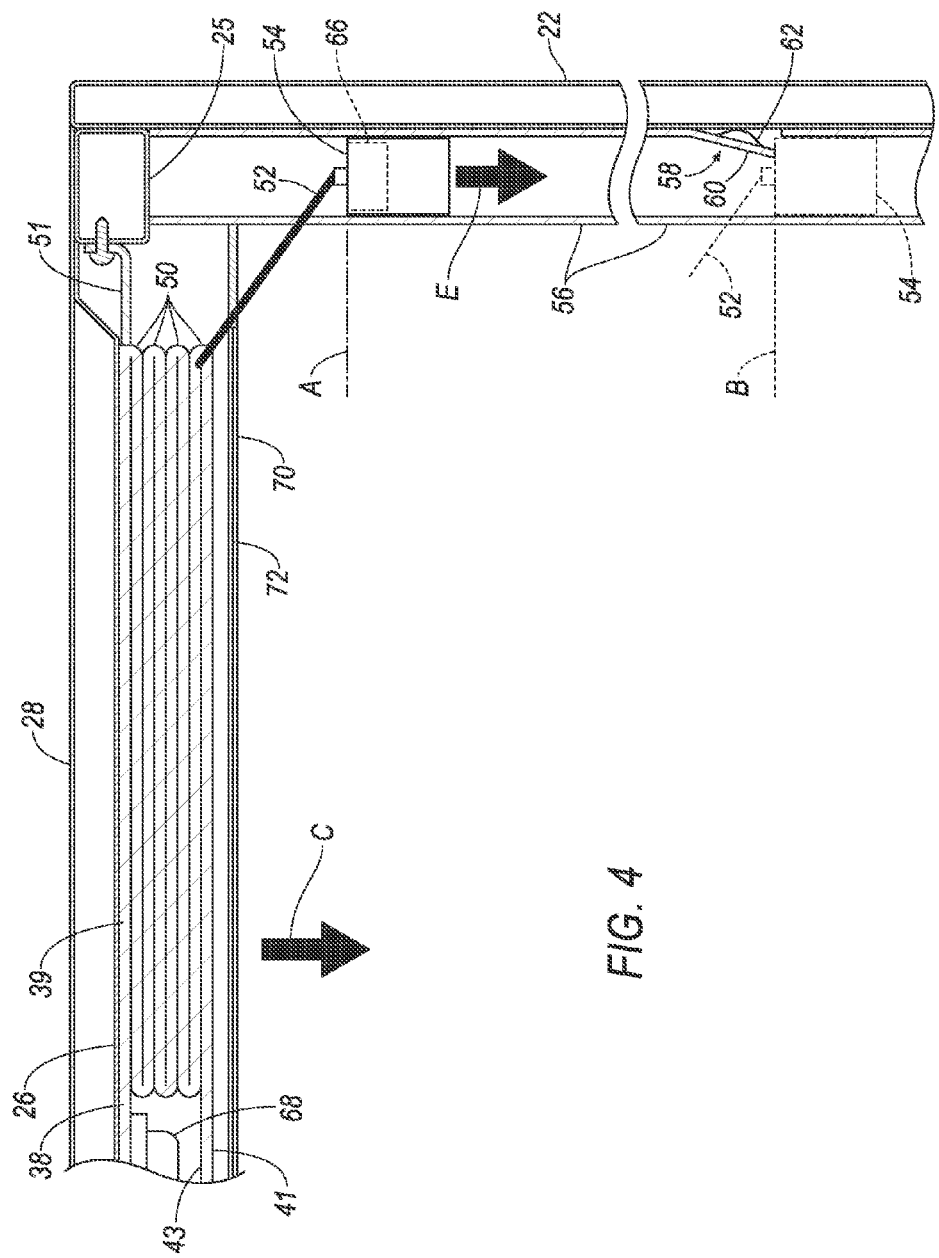
FIG. 4 is a section view of the vehicle of FIG. 3 in the direction of arrows 4.

One of the track 56 and the guide 54 may include a guide retention latch 58 providing an engagement between the track and the guide 54 that prevents the guide from returning to an initial position near the roof 12. As illustrated in FIG. 4, the example guide retention latch 58 may include a hinged plate 60 biased to an engagement position by a leaf spring 62.

The guide 54 may be in slidable engagement, i.e., slidably disposed in or over the track 56. The guide 54 may further include a displacement actuator 66 fixed to or integrated into the guide 54. The displacement actuator 66 may be a jet-like pyro actuator that when energized is biased in a downward direction by a rapid expansion of gas therein escaping from an end directed toward the roof 12.

An inflator 68 may be connected to the airbag 15. The inflator 68 expands the cavity 36 with an inflation medium, such as a gas. The inflator 68 may be, for example, a pyrotechnic inflator that uses a chemical reaction to drive the inflation medium into the cavity 36. Alternatively, the inflator 68 may be, for example, a cold-gas inflator which, when activated, ignites a pyrotechnic charge that creates an opening for releasing the pressurized inflation medium, e.g., helium, argon, directly into the cavity 36, or, alternatively via a fill tube (not shown) between the inflator 68 and the cavity 36. Alternatively, the inflator 68 may be of any suitable type, for example, a hybrid inflator.

The inflator 68 may be supported by or react against any of the roof rails 24, 25 or cross members 26, for example, as shown in FIG. 4. Alternatively, the inflator 68 may be supported by the pillars 22 or roof rails 24, 25. Yet alternatively, the inflator 68 may be disposed inside the airbag 15. For exemplary purposes, the inflator 68 is mounted inside the airbag 15, at the top panel 38 of the airbag 15, as shown in FIG. 4. The airbag 15 may be configured to mount the inflator 68 to the top panel 38 of the airbag 15, and the airbag 15 may alternatively be configured to have the inflator 68 spaced from the airbag 15.

When the inflator 68 is not disposed inside the airbag 15, one or more fill tubes (not shown) may be incorporated into the system 10, extending from ports (not shown) provided by the inflator 68 to the connection points (not shown) connecting with the cavity 36 of the airbag 15. The ports may communicate with the cavity 36 through the fill tubes connected to the connection points. The fill tube or tubes may be formed of any suitable high strength flexible material, e.g., nitrile rubber, nylon, thermoplastic elastomer (TPE), etc.

With reference to FIGS. 1-4, in the uninflated position, the airbag 15, particularly the front panel 42, and the rear panel 44, and when incorporated the side panels 46, may be folded in a compact space between the roof panel 28 and a headliner 70. For example, in the uninflated position, the top panel 38 and the bottom surface 40 may extend laterally between the rails 24, 25. The connecting panels 42, 44, and 46 are folded with the folds 50 disposed between the top panel 38 and bottom surface 40.

With reference to FIG. 5, the airbag 15 may extend from the roof 12 a length L. For example, the distance L may extend from the roof 12 to a floor 20 of the vehicle 13; i.e., the lower part 41 may be spaced the distance L from the upper part 39. In other words, the airbag 15 may extend from the roof 12 to the floor 20 in the inflated position. Specifically, the connecting panels, including the front panel 42, the rear panel 44, and the side panels 46, may extend from the roof 12 to the floor 20, as shown in FIG. 5.

As shown in FIG. 4, the vehicle 13 may include the headliner 70 adjacent to the roof 12. The airbag 15 may be disposed between the roof 12 and the headliner 70. The headliner 70 may define a tear seam 72 substantially aligned with, i.e., in substantial alignment with, the airbag 15. The tear seam 72 may extend an entire width of the headliner 70. Upon inflation of the airbag 15, the airbag 15 may break the headliner 70 at the tear seam 72 and protrude outwardly from the headliner 70 to the inflated position. Additionally, the airbag 15 may be covered by a cover (not shown) disposed between the roof panel 28 and the headliner 70. The cover may protect the airbag 15 in the uninflated position from wear and tear.

As set forth further below, the airbag 15 may inflate from an uninflated position, as shown in FIGS. 1-4, to the inflated position, as shown in FIGS. 5-6. This inflation may occur in response to a vehicle impact. The airbag 15 in the inflated position may absorb energy during the vehicle impact from an occupant 35, and thereby the airbag 15 in the inflated position may reduce a likelihood of the occupant 35 impacting other occupants 35 and/or components of the vehicle interior 18. The airbag 15 may absorb energy from the occupants 35 when the occupants 35 impact the airbag 15, and the airbag 15 may restrict movement of the occupants 35 toward each other.

As shown in Figures, the airbag 15 may be inflatable away from the roof 12 to the inflated position. Specifically, in the inflated position, the front panel 42, the rear panel 44, the side panels 46, and the airbag cavity 36 extend along a curved defined by tracks 56.

The example airbag system 10 may operate as follows. Sensors (not shown), responsive to a vehicle impact, may provide an impact data signal to the vehicle controller. The vehicle controller may, responsive to the impact data signal, may provide an actuation signal to the inflator 68. Responsive to the actuation signal, the inflator 68 releases a gas into the cavity 36. As the quantity of gas released into the cavity 36 increases, a pressure inside the airbag 15 increases, expanding the airbag 15. With the expansion of airbag 15, the airbag reacts against the roof 12 and the headliner 70. When a predetermined airbag force is reached in the space between the roof 12 and the headliner 70, the tear seam 72 of the headliner 70 may rupture, i.e., open, allowing the airbag 15 to expand beyond the headliner and into the vehicle interior 18. As the airbag 15 expands, the folds 50 in the connecting panels, i.e., the front panel 42, the rear panel 44, and side panels 46 when included, unfold, allowing the panels 42, 44, 46 to straighten.

The guides 54, disposed in the tracks 56, are initially disposed in a position A at or near the top of tracks 56. The guides 54 move downward, in the direction of arrow E of FIG. 4, as the panels 42, 44, 46 straighten. When the guides 54 are equipped with the displacement actuators 66, the guides 54 may aid in moving the bottom surface 40 of the airbag 15 toward the floor 20. As the guides 54 pass the latch 58, reaching a position B, the hinged plate 60 is displaced to a latched position by the leaf spring 62. In the latched position B, the guides 54 are blocked from moving upwards, toward position A. The tracks 56 may also include an end stop (not shown) to prevent the guides 54 from translating beyond an end of the tracks 56. The latches 58 resist any upward force on the bottom surface that may result from an impingement of any of the occupants against the panels 42, 44, 46 during an impact event, with the bottom surface 40 restrained by the latches 58, resists any tendency to move up responsive to an impact against the airbag 15 by any of the occupants 35. The mounting tethers 51 resist any downward force, maintaining the top panel 38 at the roof 12. The fully extended and inflated airbag 15 provides a protective curtain between facing occupants 35.

With the lower part 41 restrained by latches 58, and the lower part 41 being no higher than the cushion surface 31, occupants 35 are blocked from impacting each other during an impact event by the airbag 15. Having the lower part 41 no higher than the cushion surface may prevent not only an upper body of an occupant, but also lower extremities, e.g., feet and knees, of an occupant 35 from contacting a facing occupant 35 during an impact event.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
    an airbag when inflated having an upper part at a roof and a lower part above a floor and extending laterally across a vehicle interior;
    a first roof mounting tether on a left side of the upper part and a second roof mounting tether on a right side of the upper part; and
    guide tethers at a left side and a right side of the lower part connecting to left and right guides slidably engageable with first and second guide tracks.

2. The airbag assembly of claim 1, wherein the airbag has a front panel and a rear panel connecting the upper part and the lower part and the front and rear panels have folds in an uninflated position.

3. The airbag assembly of claim 2, wherein the folds are Z-shaped.

4. The airbag assembly of claim 2, wherein the airbag has internal cross-bag tethers between the front and rear panels.

5. The airbag assembly of claim 1, wherein an inflator is connected to the upper part.

6. The airbag assembly of claim 1, wherein with the airbag inflated, the lower part is spaced a distance from the upper part a distance substantially equal to a distance between the roof and the floor.

7. The airbag assembly of claim 1, wherein the guides each include a displacement actuator.

8. An airbag system comprising:
    an airbag when inflated having an upper part at a roof and a lower part above a floor and extending laterally across a vehicle interior;
    a first roof mounting tether on a first lateral side of the upper part;
    a second roof mounting tether on a second lateral side of the upper part;
    a first guide track laterally outboard of a first lateral side of the airbag;
    a second guide track laterally outboard of a second lateral side of the airbag;
    a first guide slidably engaged with the first guide track;
    a second guide slidably engaged with the second guide track;
    a first guide tether between the first guide and the airbag; and
    a second guide tether between the second guide and the airbag.

9. The airbag system of claim 8, with a displacement actuator fixed to the first and second guides.

10. The airbag system of claim 8, with a retention latch on each track at a position associated with the airbag when the airbag is inflated.

11. The airbag system of claim 8, wherein the airbag has internal cross-bag tethers.

12. The airbag system of claim 8, wherein an inflator is connected to the upper part.

13. The airbag system of claim 8, wherein the airbag has a front panel and a rear panel connecting the upper part and the lower part and the front and rear panels have folds in an uninflated position and the folds are Z-shaped.

14. A vehicle comprising:
    a roof including a fore-aft oriented first rail and a fore-aft oriented second roof rail;
    substantially vertical pillars abutting the roof rails and disposed behind front doors;
    an airbag system comprising:
        an airbag when inflated having an upper part at the roof and a lower part above a floor and extending laterally across a vehicle interior;
        a first roof mounting tether on a first lateral side of the upper part connecting the upper part to the first roof rail;
        a second roof mounting tether on a second lateral side of the upper part connecting the upper part to the second roof rail;
        a first guide track laterally outboard of a first lateral side of the airbag;
        a second guide track laterally outboard of a second lateral side of the airbag;
        a first guide slidably engaged with the first guide track;
        a second guide slidably engaged with the second guide track;
        a first guide tether on a first lateral side of the lower part between the first guide and the airbag; and
        a second guide tether on a second lateral side of the lower part between the second guide and the airbag.

15. The vehicle of claim 14, further comprising a headliner having a tear seam in substantial alignment with the airbag.

16. The vehicle of claim 14, wherein each guide track is fixed to one of the pillars.

17. The vehicle of claim 14, with a displacement actuator fixed to each of the guides.

18. The vehicle of claim 14, with a retention latch on each track at a position associated with the airbag when the airbag is inflated.

19. The vehicle of claim 14, wherein the airbag has internal cross-bag tethers.

20. The vehicle of claim 14, wherein when the airbag is inflated, the lower part is spaced a distance from the upper part a distance substantially equal to a distance between a roof of a vehicle and a floor of a vehicle.

\* \* \* \* \*